United States Patent
Joeng

(10) Patent No.: US 9,254,744 B2
(45) Date of Patent: Feb. 9, 2016

(54) ELECTRIC FOUR-WHEEL DRIVE SYSTEM AND FRONT WHEEL DRIVE VEHICLE PROVIDED WITH THE SAME

(71) Applicant: HYUNDAI MOTOR COMPANY, Seoul (KR)

(72) Inventor: Ji Yoel Joeng, Gwangmyeong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/512,031

(22) Filed: Oct. 10, 2014

(65) Prior Publication Data

US 2015/0158384 A1    Jun. 11, 2015

(30) Foreign Application Priority Data

Dec. 5, 2013    (KR) .................. 10-2013-0150697

(51) Int. Cl.
*B60K 17/356*  (2006.01)
*B60K 17/34*   (2006.01)

(52) U.S. Cl.
CPC ............ *B60K 17/356* (2013.01); *B60K 17/34* (2013.01)

(58) Field of Classification Search
CPC ......... B60K 17/34; B60K 17/356; B60K 6/52
USPC ....................................................... 180/242
See application file for complete search history.

(56) References Cited

U.S. PATENT DOCUMENTS

| | | | | |
|---|---|---|---|---|
| 5,662,356 A | * | 9/1997 | Lund | 280/5.502 |
| 5,941,334 A | * | 8/1999 | Inagaki | 180/242 |
| 6,315,373 B1 | * | 11/2001 | Yamada et al. | 303/191 |
| 6,843,538 B1 | * | 1/2005 | Nagae et al. | 303/146 |
| 7,004,870 B2 | * | 2/2006 | Kroppe | 475/86 |
| 7,055,832 B2 | * | 6/2006 | Germain | 280/5.508 |
| 7,475,895 B2 | * | 1/2009 | Stacey et al. | 280/124.16 |
| 7,762,562 B2 | * | 7/2010 | Sugiyama | 280/5.509 |
| 8,751,109 B2 | * | 6/2014 | Watanabe | 701/41 |
| 8,783,390 B2 | * | 7/2014 | Maeda et al. | 180/6.2 |
| 2003/0230443 A1 | * | 12/2003 | Cramer et al. | 180/65.5 |
| 2009/0108671 A1 | * | 4/2009 | Maeda et al. | 303/146 |

FOREIGN PATENT DOCUMENTS

| | | |
|---|---|---|
| JP | 5086667 B2 | 11/2012 |
| JP | 2013-189992 A | 9/2013 |
| KR | 10-2013-0073313 A | 7/2013 |

* cited by examiner

*Primary Examiner* — Kevin Hurley
*Assistant Examiner* — Michael Stabley
(74) *Attorney, Agent, or Firm* — McDermott Will & Emery LLP

(57) ABSTRACT

An electric four-wheel drive (4WD) system is for a front wheel drive vehicle including an active roll control apparatus includes a driving module configured to generate a rotational power using electrical energy and to supply the rotational power to rear wheels. A hydraulic generator is connected with the driving module and configured to generate a hydraulic pressure using the rotational power of the driving module and to supply the hydraulic pressure to the active roll control apparatus.

12 Claims, 3 Drawing Sheets

ELECTRIC FOUR-WHEEL DRIVE SYSTEM AND FRONT WHEEL DRIVE VEHICLE PROVIDED WITH THE SAME

CROSS-REFERENCE TO RELATED APPLICATION

This application claims the benefit of priority to Korean Patent Application No. 10-2013-0150697 filed in the Korean Intellectual Property Office on Dec. 5, 2013, the entire contents of which are incorporated herein by reference.

TECHNICAL FIELD

The present disclosure relates to an electric four-wheel drive system and a front wheel drive vehicle provided with the same. More particularly, the present disclosure relates to an electric four-wheel drive system supplying rotational power to rear wheels and a front wheel drive vehicle provided with the same.

BACKGROUND

An electric four-wheel drive (4WD) system, which is a four-wheeled system that allows all four wheels to receive torque, drives two rear wheels with an electric motor to supplement traction available to a front wheel drive vehicle, and may achieve 4WD and hybrid electric vehicle (HEV) functions.

A vehicle provided with the electric 4WD system includes an engine and a transmission for driving front wheels. A generator is configured to generate electrical energy from mechanical energy of the engine and supply the electrical energy to a battery. The electric 4WD system drives the rear wheels using the electric motor powered by the battery and a decelerator which decelerates the rotational speed of the motor. An output of the decelerator is transmitted to the rear wheels through a drive shaft. Here, the weight of the vehicle provided with the electric 4WD system can be reduced by eliminating, for example, a propeller shaft to reduce the fuel consumption and power loss in starting and driving of the vehicle.

The vehicle provided with the electric 4WD system may be provided with an active roll control apparatus controlling roll characteristic of a vehicle. The active roll control apparatus may adjust rigidity of stabilizer bars of front and rear wheels which operate an actuator using hydraulic pressure for enhancing turning stability of the vehicle.

The active roll control apparatus includes the actuator mounted to the stabilizer bars of the front and rear wheels. A hydraulic pressure pump supplies hydraulic pressure to the stabilizer bars, and a valve block supplies the hydraulic pressure to the actuator according to a control signal of an electronic control unit (ECU).

However, the electric 4WD system and the active roll control apparatus have a complicated structure, and marketability may be deteriorated due to the manufacturing cost and the weight.

The above information disclosed in this Background section is only for enhancement of understanding of the background of the invention, and therefore, it may contain information that does not form the prior art that is already known in this country to a person of ordinary skill in the art.

SUMMARY

The present disclosure has been made in an effort to provide an electric four-wheel drive (4WD) system and a front wheel drive vehicle provided with the same, having advantages of simplifying the structure by combining some elements with an active roll control apparatus.

An electric 4WD system for a front wheel drive vehicle including an active roll control apparatus according to an exemplary embodiment of the present disclosure includes include a driving module configured to generate a rotational power using electrical energy and to supply the rotational power to rear wheels. A hydraulic generator is connected with the driving module, and configured to generate a hydraulic pressure using the rotational power of the driving module and to supply the hydraulic pressure to the active roll control apparatus.

The hydraulic generator may include a pump connected to the driving module.

The pump may include a pump body of which a pump chamber is formed therein. A rotation shaft is rotatably mounted to the pump body and receives an output of the driving module. An impeller is connected to the rotation shaft and generates a hydraulic pressure within the pump chamber.

The driving module may include a motor and a reduction structure connected with the motor.

The rotation shaft may be connected with an output shaft of the reduction structure through a belt.

The pump may communicate with a valve block of the active roll control apparatus.

The motor may be an inline motor distributing the rotational power thereof to both rear wheels.

A front wheel drive vehicle according to an exemplary embodiment of the present disclosure may include an active roll control apparatus and an electric 4WD system configured to supply an electrical power to rear wheels. The electric 4WD system includes a driving module configured to generate a rotational power using electrical energy and to supply the rotational power to the rear wheels. A hydraulic generator is connected with the driving module, and configured to generate a hydraulic pressure using the rotational power of the driving module and to supply the hydraulic pressure to the active roll control apparatus.

The electric 4WD system and a front wheel drive vehicle provided with the same according to exemplary embodiments of the present disclosure may simplify the structure by combining some elements with an active roll control apparatus and may reduce the manufacturing cost and the weight, and thus, marketability may be enhanced.

BRIEF DESCRIPTION OF THE DRAWINGS

The drawings are intended to be used as references for describing the illustrative exemplary embodiments of the present disclosure, and the accompanying drawings should not be construed as limiting the technical spirit of the present disclosure.

DETAILED DESCRIPTION

Figure 1:
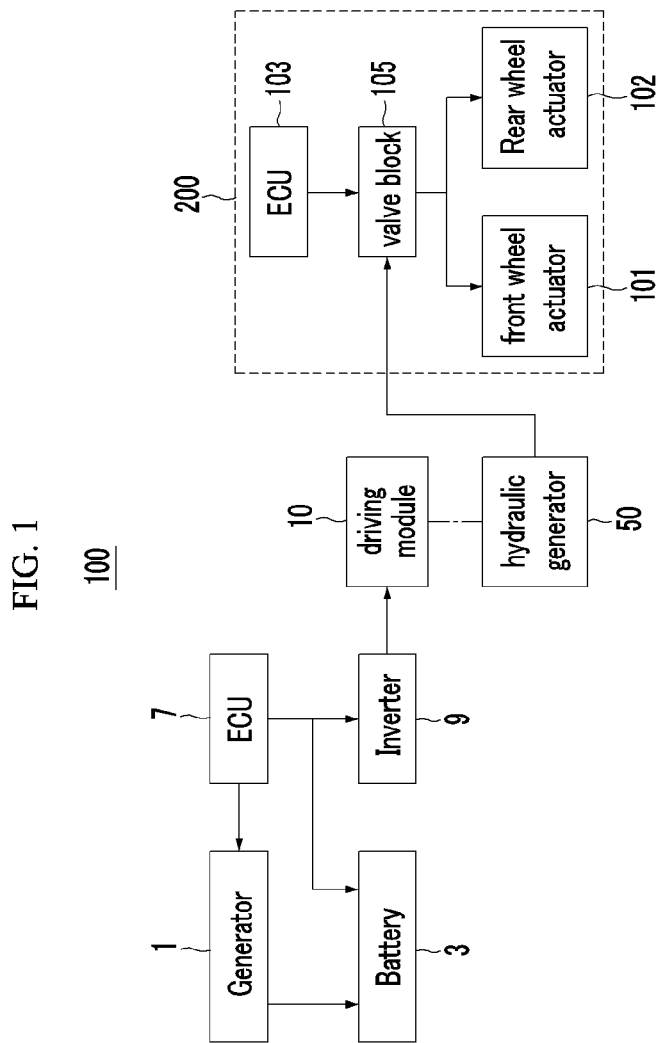
FIG. 1 is a block diagram of an electric 4WD system according to an exemplary embodiment of the present disclosure.

The present disclosure will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Parts which are not associated with the description are omitted in order to specifically describe the present invention, and like reference numerals refer to like elements throughout the specification.

The size and thickness of each component illustrated in the drawings are arbitrarily shown for understanding and ease of description, but the present invention is not limited thereto. Thicknesses of several portions and regions are enlarged for clear expressions.

Further, in the following detailed description, names of constituents, which are in the same relationship, are divided into "the first," "the second," and the like, but the present invention is not limited to the order in the following description.

In addition, unless explicitly described to the contrary, the word "comprise" and variations such as "comprises" or "comprising," will be understood to imply the inclusion of stated elements but not the exclusion of any other elements.

In addition, "unit," "means," "part," "member," or the like, which is described in the specification, means a unit of a comprehensive configuration that performs at least one function or operation.

FIG. 1 is a block diagram of an electric four-wheel drive (4WD) system according to an exemplary embodiment of the present disclosure.

Referring to FIG. 1, an electric 4WD system 100 according to an exemplary embodiment of the present disclosure may be applied to a hybrid vehicle which uses an engine torque as a main power and a motor torque generated by electrical energy as an assistance power. For example, the electric 4WD system 100 according to an exemplary embodiment of the present disclosure may be applied to drive rear wheels of a front wheel drive vehicle.

The electric 4WD system 100 according to an exemplary embodiment of the present disclosure may be an inline system including the motor driving both rear wheels.

The front wheel drive vehicle provided with the electric 4WD system 100 according to an exemplary embodiment of the present disclosure includes a generator 1 converting mechanical energy of the engine to electrical energy. The vehicle further includes a battery 3 storing the electrical energy of generator 1 and supplying to the motor.

Further, the vehicle provided with the electric 4WD system 100 according to an exemplary embodiment of the present disclosure includes an active roll control apparatus 200 which may adjust rigidity of stabilizer bars of front and rear wheels. The active roll control apparatus 200 operates an actuator using hydraulic pressure for enhancing turning stability of the vehicle.

The electric 4WD system 100 according to the present disclosure may simplify its structure by combining some elements with the active roll control apparatus 200 and may reduce the manufacturing cost and the weight, and thus, marketability may be improved.

That is, parts of the electric 4WD system 100 according to an exemplary embodiment of the present disclosure are combined with the active roll control apparatus 200 and to provide the hydraulic pressure to the active roll control apparatus 200 as an operation medium.

The electric 4WD system 100 according to an exemplary embodiment of the present disclosure includes a driving module 10 and a hydraulic generator 50. The driving module 10 receives electric power from the battery 3 and operates according to a control signal from an electronic control unit (ECU) 7. The driving module 10 receives converted electric power from an inverter 9 which converts DC electric power of the battery 3 to 3-phase electric power of U, V, W phases.

Figure 2:
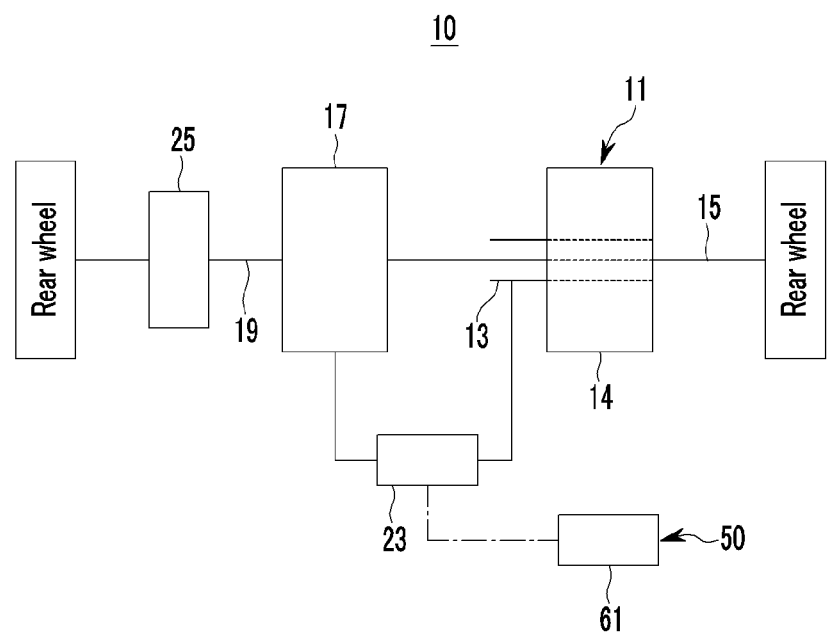
FIG. 2 is a block diagram of a driving module applied to an electric 4WD system according to an exemplary embodiment of the present disclosure.

FIG. 2 is a block diagram of a driving module applied to an electric 4WD system according to an exemplary embodiment of the present disclosure.

Referring to FIG. 2, the driving module 10 includes a motor 11 for receiving AC electric power from the inverter 9 (referring to FIG. 1) and generating rotational power. The motor 11 may be a hollow motor having a hollow shaft 13 mounted to a rotor. Further, the motor 11 may be an inline motor 14 distributing the rotational power thereof to both rear wheels.

A first rear wheel drive shaft 15 connected to one rear wheel is disposed within the hollow shaft 13. The first rear wheel drive shaft 15 is connected with a differential structure 17, and the differential structure 17 is connected with a second rear wheel drive shaft 19.

The hollow shaft 13 of the motor 11 is engaged with a reduction structure 23 receiving the rotational power of the hollow shaft 13, reducing the rotational speed of the hollow shaft 13, and transmitting the rotational power of the hollow shaft 13 to the differential structure 17. A clutch 25 is configured to selectively cut off the rotational power transmitted from the motor 11.

The motor 11 of the driving module 10, the reduction structure 23, the clutch 25, and the like are obvious to a person skilled in the art, and thus, detailed description will be omitted.

Referring to FIGS. 1 and 2, the hydraulic generator 50 is connected with the driving module 10, generates hydraulic pressure using the rotational power of the driving module 10, and supplies the hydraulic pressure to the active roll control apparatus 200.

The active roll control apparatus 200 includes actuators 101 and 102 mounted to a front wheel stabilizer bar and a rear wheel stabilizer bar (not shown), respectively. A valve block 105 distributes the hydraulic pressure supplied from the hydraulic generator 50 to each actuator 101 and 102 according to a control signal of an ECU 103.

The actuators 101 and 102 include a hydraulic pressure cylinder (not shown) respectively, and the valve block 105 includes hydraulic pressure control valves (not shown) which are operated according to the control signal of the ECU 103.

The hydraulic generator 50 includes a pump 61 connected to the driving module 10. The pump 61 receives oil from a reservoir 80, generates the hydraulic pressure, and supplies the hydraulic pressure to the valve block 105 of the active roll control apparatus 200. The pump 61 may be connected with the driving module 10 (see FIG. 3)

Figure 3:
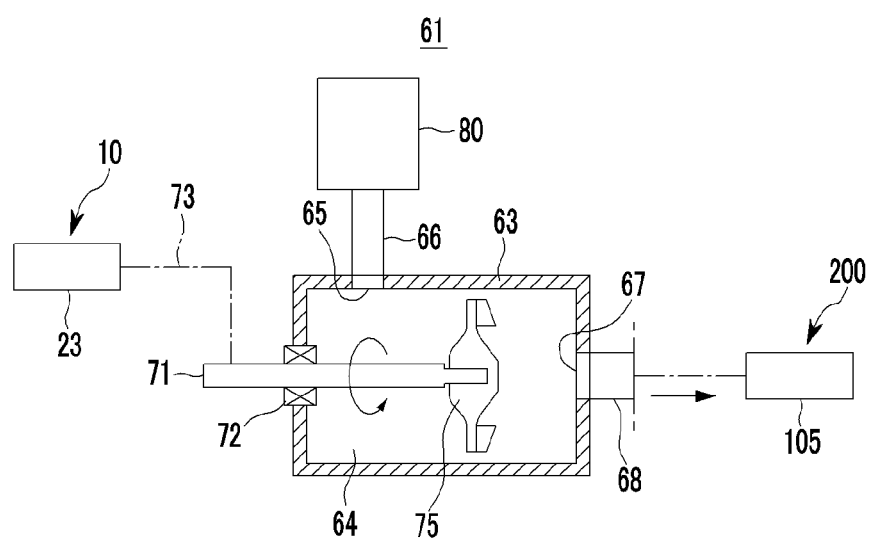
FIG. 3 is a drawing showing a pump of a hydraulic generator applied to an electric 4WD system according to an exemplary embodiment of the present disclosure.

FIG. 3 is a drawing showing a pump of a hydraulic generator applied to an electric 4WD system according to an exemplary embodiment of the present disclosure.

Referring to FIGS. 1 to 3, the pump 61 includes a pump body 63 of which a pump chamber 64 is formed therein. An inlet 65 for receiving oil and an outlet 67 supplying the oil are formed to the pump body 63. The inlet 65 communicates with the reservoir 80 through an oil receiving line 66, and the outlet 67 communicates with the valve block 105 of the active roll control apparatus 200 through an oil supplying line 68.

A rotation shaft 71 is rotatably mounted to the pump body 63 through a bearing 72, and the rotation shaft 71 is connected with the reduction structure 23 of the driving module 10. The rotation shaft 71 may be connected with an output shaft of the reduction structure 23 though a belt 73.

An impeller 75 is connected with the rotation shaft 71 within the pump chamber 64 of the pump body 63 for generating hydraulic pressure. When the rotation shaft 71 rotates by the rotational power of the reduction structure 23, the impeller 75 rotates and generates pressure within the pump chamber 64 of the pump body 63 to receive the oil and to supply the oil.

Hereinafter, operations of the electric 4WD system 100 according to an exemplary embodiment of the present disclosure will be discussed.

In a driving mode or a regenerative braking mode using the driving module 10, the ECU 7 outputs a control signal to the battery 3 and the inverter 9 in order to operate the motor 11 of the driving module 10. Then, the motor 11 rotates the rear wheels though the reduction structure 23.

In this states, the rotational power of the reduction structure 23 is also transmitted to the pump 61 of the hydraulic generator 50 through the belt 73. Thus, the rotation shaft 71 of the pump 61 is rotated by the rotational power of the reduction structure 23.

Then, the impeller 75 rotates and generates pressure within the pump chamber 64 of the pump body 63 to receive the oil and to supply the oil. Thus, the oil in the reservoir 80 is supplied to the pump chamber 64 through the inlet 65 of the pump body 63 and then supplied through the outlet 67. The oil output from the pump body 63 is supplied to the valve block 105 of the active roll control apparatus 200 through the oil supplying line 68.

In controlling of the roll of the vehicle by the active roll control apparatus 200, the ECU 103 transmits a control signal to the valve block 105 of the active roll control apparatus 200. Thus, the valve block 105 of the pump 61 may distribute the supplied oil to the actuators 101 and 102 mounted to the front and the rear stabilizer bars.

According to the exemplary embodiment of the present disclosure, rigidity of stabilizer bars of front and rear wheels may be adjusted by operating the actuators 101 and 102 using hydraulic pressure for enhancing turning stability of a vehicle.

As described above, the electric 4WD system 100 according to an exemplary embodiment of the present disclosure may combine the hydraulic generator 50 to the driving module 10, thus the hydraulic generator 50 may generate hydraulic pressure using the rotational power of the driving module 10 and supply the hydraulic pressure to the active roll control apparatus 200 for activating the actuators 101 and 102.

According to the exemplary embodiment of the present disclosure, the total elements may be reduced by combining some elements with the active roll control apparatus 200 and the electric 4WD system 100, and thus, the manufacturing cost and the weight may be reduced and marketability may be enhanced.

While the present disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An electric four-wheel drive (4WD) system for a front wheel drive vehicle including an active roll control apparatus, the electric 4WD system comprising:
 a driving module configured to generate a rotational power using electrical energy and to supply the rotational power to rear wheels; and
 a hydraulic generator, which is connected with the driving module, configured to generate a hydraulic pressure using the rotational power of the driving module and to supply the hydraulic pressure to the active roll control apparatus;
 wherein the hydraulic generator comprises a pump connected to the driving module, and wherein the pump comprises:
 a pump body of which a pump chamber is formed therein;
 a rotation shaft rotatably mounted to the pump body, the rotation shaft receiving an output of the driving module; and
 an impeller connected to the rotation shaft, the impeller generating a hydraulic pressure within the pump chamber.

2. The electric 4WD system of claim 1, wherein the driving module comprises:
 a motor; and
 a reduction structure connected to the motor.

3. The electric 4WD system of claim 2, wherein the rotation shaft is connected with an output shaft of the reduction structure through a belt.

4. The electric 4WD system of claim 2, wherein the motor is an inline motor distributing the rotational power thereof to both rear wheels.

5. The electric 4WD system of claim 1, wherein the pump communicates with a valve block of the active roll control apparatus.

6. The electric 4WD system of claim 1, wherein the driving module is configured to receive an electric power from a battery and to operate according to a control signal from an electronic control unit (ECU).

7. The electric 4WD system of claim 1, further comprising:
 a pair of actuators mounted to a front wheel stabilizer and a rear wheel stabilizer, respectively, receiving the hydraulic pressure.

8. A front wheel drive vehicle comprising:
 an active roll control apparatus; and
 an electric 4WD system configured to supply an electric power to rear wheels of the vehicle;
 wherein the electric 4WD system comprises:
 a driving module configured to generate a rotational power using electrical energy and supplying the rotational power to the rear wheels; and
 a hydraulic generator, which is connected with the driving module, configured to generate a hydraulic pressure using the rotational power of the driving module and to supply the hydraulic pressure to the active roll control apparatus;
 wherein the hydraulic generator comprises a pump connected to the driving module, and wherein the pump comprises:
 a pump body of which a pump chamber is formed therein;
 a rotation shaft rotatably mounted to the pump body, the rotation shaft receiving an output of the driving module; and
 an impeller connected to the rotation shaft, the impeller generating a hydraulic pressure within the pump chamber.

9. The front wheel drive vehicle of claim 8, wherein the driving module comprises:
 a motor; and
 a reduction structure connected to the motor.

10. The front wheel drive vehicle of claim 8, wherein the rotation shaft is connected with an output shaft of the reduction structure through a belt.

11. The front wheel drive vehicle of claim 8, wherein the motor is an inline motor distributing the rotational power thereof to both rear wheels.

12. The front wheel drive vehicle of claim 8, wherein the pump communicates with a valve block of the active roll control apparatus.

\* \* \* \* \*